Figure 1:
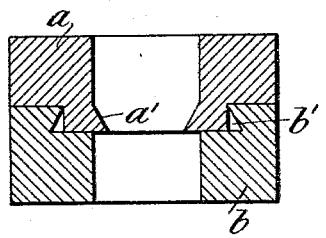

(No Model.)

A. MOSLEY.
COMBINED NUT AND LOCK NUT.

No. 559,782. Patented May 5, 1896.

Witnesses.
E. A. Bulloch.
Guy E. Davis.

Inventor.
Aaron Mosley,
By his Attorneys
Baldwin Davidson & Wight

ANDREW B.GRAHAM, PHOTO-LITHO. WASHINGTON, D.C.

UNITED STATES PATENT OFFICE.

AARON MOSLEY, OF NOTTINGHAM, ENGLAND, ASSIGNOR TO HOPEWELL & SON, OF SAME PLACE.

COMBINED NUT AND LOCK-NUT.

SPECIFICATION forming part of Letters Patent No. 559,782, dated May 5, 1896.

Application filed January 4, 1896. Serial No. 574,365. (No model.)

*To all whom it may concern:*

Be it known that I, AARON MOSLEY, mechanic, a subject of the Queen of Great Britain, residing at 230 Arkwright Street, Nottingham, England, have invented a Combined Nut and Lock-Nut, of which the following is a specification.

The lock-nut and nut to be locked by it are connected together by a swivel-joint in such manner that one can be turned without the other. When in one position, the nuts form, to all appearance, a single nut, and when both have been screwed onto a screw-bolt a partial turn given to the lock-nut locks them securely.

My invention is illustrated in the drawings annexed.

Figure 3:
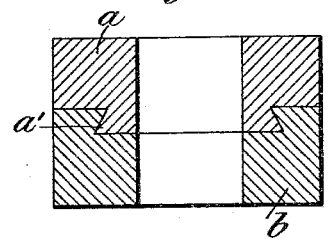
Figure 2:
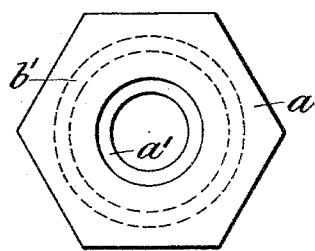
Figure 4:
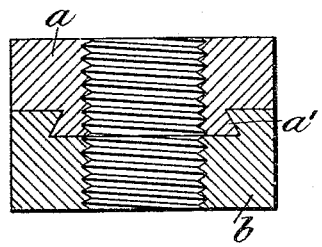
Figure 5:
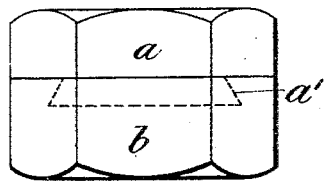

Figure 1 is a section of the two parts from which the combined nut and lock-nut are to be formed. Fig. 2 is a plan of the same. Fig. 3 is a section of the same parts when the swivel-joint which is to connect them together has been completed. Fig. 4 is a section of the same parts when a screw-thread has been cut in them. Fig. 5 is a side elevation of the combined nut and lock-nut.

The combined nut and lock-nut is formed from two parts $a$ and $b$, each similar to an ordinary nut-blank, but one part, $a$, having a projection $a'$ extending from one of its ends, and the other, $b$, having around the central hole formed through it an undercut recess $b'$, into which the projection $a'$ is to be made to fit. When the two parts have been placed together, as shown at Fig. 1, a cylindrical punch, fitting to the cylindrical portion of the holes in the two parts and having a tapering end, is forced through the holes, thereby forcing outward the portion of the projection $a'$ which previously protruded inward and making the projection to fit below the undercut outer side of the recess $b'$, so securing the two parts together by a swivel-joint. Afterward a screw-thread is cut through the two parts thus held together, and the combined nut and lock-nut is complete. When screwed onto a screw-nut, a partial turn given to the lock-nut locks both parts securely. A partial turn in the reverse direction sets both parts loose, and they can then both together be unscrewed from the screw-bolt just as an ordinary single nut would be unscrewed, and this can be repeated any number of times without damaging either the screw-thread in the nuts or the screw-thread on the screw-bolt.

What I claim is—

1. A nut and lock-nut abutting end to end rotatable with reference to each other and permanently linked together by a recess with undercut outer side formed uniformly all around the end of the central hole in one, being filled by a corresponding projection on the end of the other and both having one uniform continuous screw-thread formed through them.

2. A nut and lock-nut abutting end to end rotatable to each other and permanently linked together by a recess with undercut outer side formed uniformly all around the end of the central hole in one, being filled by a corresponding projection on the end of the other and both having one uniform screw-thread formed through them which is continuous when the outer sides of the two nuts coincide with one another.

AARON MOSLEY.

Witnesses:
ROBERT HALLAM,
WALTER MEAKER.